(12) United States Patent
Chuang

(10) Patent No.: US 7,647,020 B2
(45) Date of Patent: Jan. 12, 2010

(54) MULTI-MODE FOLDABLE ELECTRONIC APPARATUS AND METHOD THEREOF

(75) Inventor: Cheng-Chia Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 712 days.

(21) Appl. No.: 11/308,017

(22) Filed: Mar. 3, 2006

(65) Prior Publication Data

US 2007/0054709 A1 Mar. 8, 2007

(30) Foreign Application Priority Data

Sep. 5, 2005 (TW) .............................. 94130264 A

(51) Int. Cl.
*H04B 7/14* (2006.01)
(52) U.S. Cl. .................... 455/19; 455/575.3; 455/90.3; 16/54; 16/294; 439/31
(58) Field of Classification Search ............. 455/575.1, 455/566, 575.4, 575.3, 550.1, 90.3; 16/366, 16/54, 221, 233, 294; 439/374, 38–40, 31
See application file for complete search history.

(56) References Cited

U.S. PATENT DOCUMENTS

| 2003/0153372 | A1* | 8/2003 | Shimamura et al. | ......... 455/575 |
| 2004/0198474 | A1* | 10/2004 | Jung et al. | ............... 455/575.1 |
| 2005/0054303 | A1* | 3/2005 | Goltermann et al. | ........ 455/90.3 |
| 2005/0125570 | A1* | 6/2005 | Olodort et al. | ................. 710/15 |
| 2005/0136853 | A1* | 6/2005 | Lenchik et al. | ............. 455/90.3 |
| 2005/0195160 | A1* | 9/2005 | Tamura | ...................... 345/156 |
| 2005/0215296 | A1* | 9/2005 | Fujihara et al. | ........... 455/575.3 |
| 2006/0135226 | A1* | 6/2006 | Won et al. | ................. 455/575.3 |
| 2009/0061961 | A1* | 3/2009 | Ueta | ....................... 455/575.3 |

FOREIGN PATENT DOCUMENTS

JP 2005286425 * 3/2004
TW 589854 6/2004

* cited by examiner

*Primary Examiner*—Sujatha Sharma
(74) *Attorney, Agent, or Firm*—Jianq Chyun IP Office

(57) ABSTRACT

A multi-mode foldable electronic apparatus and the method thereof are provided. The multi-mode foldable electronic apparatus includes a first housing, a second housing, a first hinge, a second hinge and a system. The first hinge and the second hinge are used for connecting the first housing and the second housing. A first magnet and a second magnet are disposed in the first housing, and magnetism changes when the first and the second magnet being moved. A first magnetism sensor disposed in the second housing is used for sensing the changes in magnetism of the first magnet and generates a first signal thereby. A second magnetism sensor disposed in the second housing is used for sensing the changes in magnetism of the second magnet to generate a second signal thereby. The system commands the apparatus in one of different modes in response to the first and the second signals being received.

28 Claims, 4 Drawing Sheets

MULTI-MODE FOLDABLE ELECTRONIC APPARATUS AND METHOD THEREOF

CROSS-REFERENCE TO RELATED APPLICATION

This application claims the priority benefit of Taiwan application serial no. 94130264, filed on Sep. 5, 2005. All disclosure of the Taiwan application is incorporated herein by reference.

BACKGROUND OF THE INVENTION

1. Field of Invention

The present invention relates to an electronic apparatus and more particularly to a multi-mode foldable electronic apparatus that can switch to different modes automatically.

2. Description of Related Art

In current information age, it is common that people communicate with each other by electronic communication apparatuses, especially the portable communication apparatuses, such as mobile telephone and other electronic apparatuses with the function of wireless communication. Nowadays, along with the rapid development of the mobile communication technology, the functions of the mobile telephone are continuously developed, including music playing, radio, Personal Digital Assistant (PDA), built-in digital camera, etc.

It should be noted that the foldable cellular phone garners a fairly high market share in the cellular phone market for its multiple operating interfaces and display window of big size. However, with various functions, users of foldable cellular phone needs to input a command to the system of the cellular phone by means of touch input interface for switching to one mode corresponding as required.

SUMMARY OF THE INVENTION

Accordingly, the present invention is directed to provide a multi-mode foldable electronic apparatus and the method thereof, for enabling users to switch the multi-mode electronic apparatus among different modes more easily.

The invention provides a multi-mode foldable electronic apparatus and the method thereof based on the above and other purposes of the invention. The multi-mode foldable electronic apparatus comprises a first housing, a second housing, a first hinge, a second hinge, a first magnet, a first magnetism sensor, a second magnet and a second magnetism sensor. The first magnet is disposed in the first housing, and the second magnet is disposed in the first housing and is disposed on one side of the first hinge, in order to rotate along with the first hinge and move along with the first housing being moved. The first magnetism sensor is disposed in the second housing to opposite to the first magnet, for sensing the changes in magnetism of the first magnet as the first magnet being moved. The second magnetism sensor is also disposed in the second housing to opposite to the second magnet, for sensing the changes in magnetism of the second magnet as the second magnet is moved.

According to an embodiment, the first magnetism sensor and the second magnetism sensor are connected to a system.

According to an embodiment of the invention, the first magnetism sensor senses the changes in magnetism of the first magnet, generates a first signal thereby and sends it to the system. The second magnetism sensor senses the changes in magnetism of the second magnet to generate a second signal thereby for sending to the system. When the first housing rotates relative to the second housing via the second hinge, the first magnetism sensor identifies the changes in magnetism of the first magnet as the first magnet being moved to generate a first signal thereby for sending to the system. In the meantime, the second magnetism sensor identifies the changes in magnetism of the second magnet as the second magnet being moved to generate a second signal thereby for sending to the system. The system commends the multi-mode foldable electronic apparatus in a first mode when receiving the first signal and the second signal simultaneously, wherein the first mode may be a Personal Digital Assistant (PDA) mode.

When the first housing rotates relative to the second housing via the first hinge, the first magnetism sensor identifies changes in magnetism of the first magnet as the first magnet being moved to generate a first signal thereby for sending to the system. At this time, the second magnetism sensor does not generate a second signal because it does not identify the changes in magnetism of the second magnet. The system commands the multi-mode foldable electronic apparatus in a second mode when receiving the first signal, wherein the second mode may be a cellular phone mode.

According to an embodiment of the invention, the system commands the multi-mode foldable electronic apparatus in a standby mode when not receiving the first and the second signals.

According to an embodiment of the invention, the first magnetism sensor may be a magneto-resistive sensor, while the second magnetism sensor may be a magneto-resistive sensor.

According to an embodiment of the invention, the multi-mode foldable electronic apparatus further may comprise an image display interface disposed in the first housing or the second housing.

According to an embodiment of the invention, the multi-mode foldable electronic apparatus can further comprise a touch input interface disposed in the first housing or the second housing.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
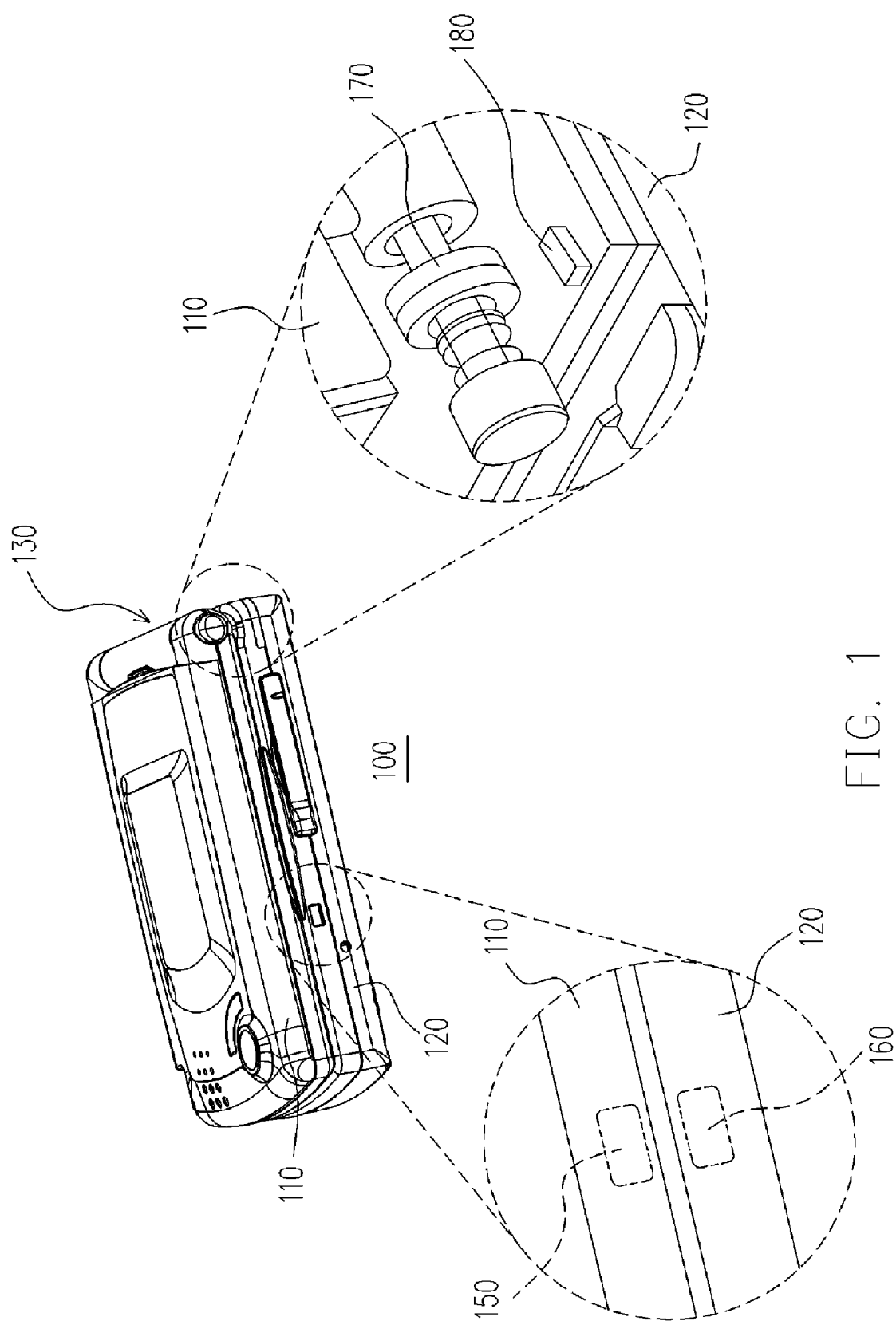
FIG. 1 illustrates a multi-mode foldable electronic apparatus according to an embodiment of the invention.

FIG. 1 illustrates a multi-mode foldable electronic apparatus according to an embodiment of the invention. Referring to FIG. 1, the multi-mode foldable electronic apparatus 100 comprises a first housing 110, a second housing 120, a first hinge 130, and a second hinge 140 (referring to FIG. 2A). The first hinge 130 and the second hinge 140, that may be L-shaped, are used for connecting the first housing 110 and the second housing 120 respectively.

The multi-mode foldable electronic apparatus 100 of the embodiment further comprises a first magnet 150, a first magnetism sensor 160, a second magnet 170 and a second magnetism sensor 180. The first magnet 150 is disposed in the first housing 110 while the circular second magnet 170 is disposed in the first housing 110 and on one side of the hinge 130 to rotate along with the hinge 130 and to move along with the first housing 110. Furthermore, the first magnetism sensor 160 is disposed in the second housing 120 to opposite to the first magnet 150, for sensing changes in magnetism of the first magnet 150 being moved. The second magnetism sensor 180 is also disposed in the second housing 120 to opposite to the second magnet 170, for sensing changes in magnetism of the second magnet 170 being moved. The first magnetism sensor 160 and the second magnetism sensor 180 are connected to a system (not shown), which will command the multi-mode foldable electronic apparatus 100 to switch to different modes corresponding to the signals received. The second magnet 170 disposed on one side of the hinge 130 may not rotate along with the hinge 130 as required in different products.

In the embodiment of the invention, the first magnetism sensor 160 can be a magneto-resistive sensor (MR sensor) or a magnetic pole sensor, while the second magnetism sensor 180 can be a magneto-resistive sensor. Additionally, the multi-mode foldable electronic apparatus 100 may further comprise an image display interface disposed in the first housing 110 for displaying an image. Moreover, the multi-mode foldable electronic apparatus 100 may further comprise a touch input interface (such as a keyboard) disposed in the second housing 120 for enabling the users to input command or data by touch input. To meet the requirements of different product designs, the image display interface can be disposed in the second housing 120 of the multi-mode foldable electronic apparatus 100 and the touch input interface can be disposed in the first housing 110 of the multi-mode foldable electronic apparatus 100 corresponding to the position of the image display interface, without limiting the scope of the invention.

Referring to FIG. 1, if the first housing 110 and the second housing 120 of the multi-mode foldable electronic apparatus 100 are closed, neither the first magnetism sensor 160 sense any change in magnetism of the first magnet 150, nor the second magnetism sensor 180 sense any change in magnetism of the second magnet 170. Since the system does not receive any signal generated by the first magnetism sensor 160 or the second magnetism sensor 180 about changes in magnetism, it will command the multi-mode foldable electronic apparatus 100 maintain in a stand-by mode.

Figure 2A:
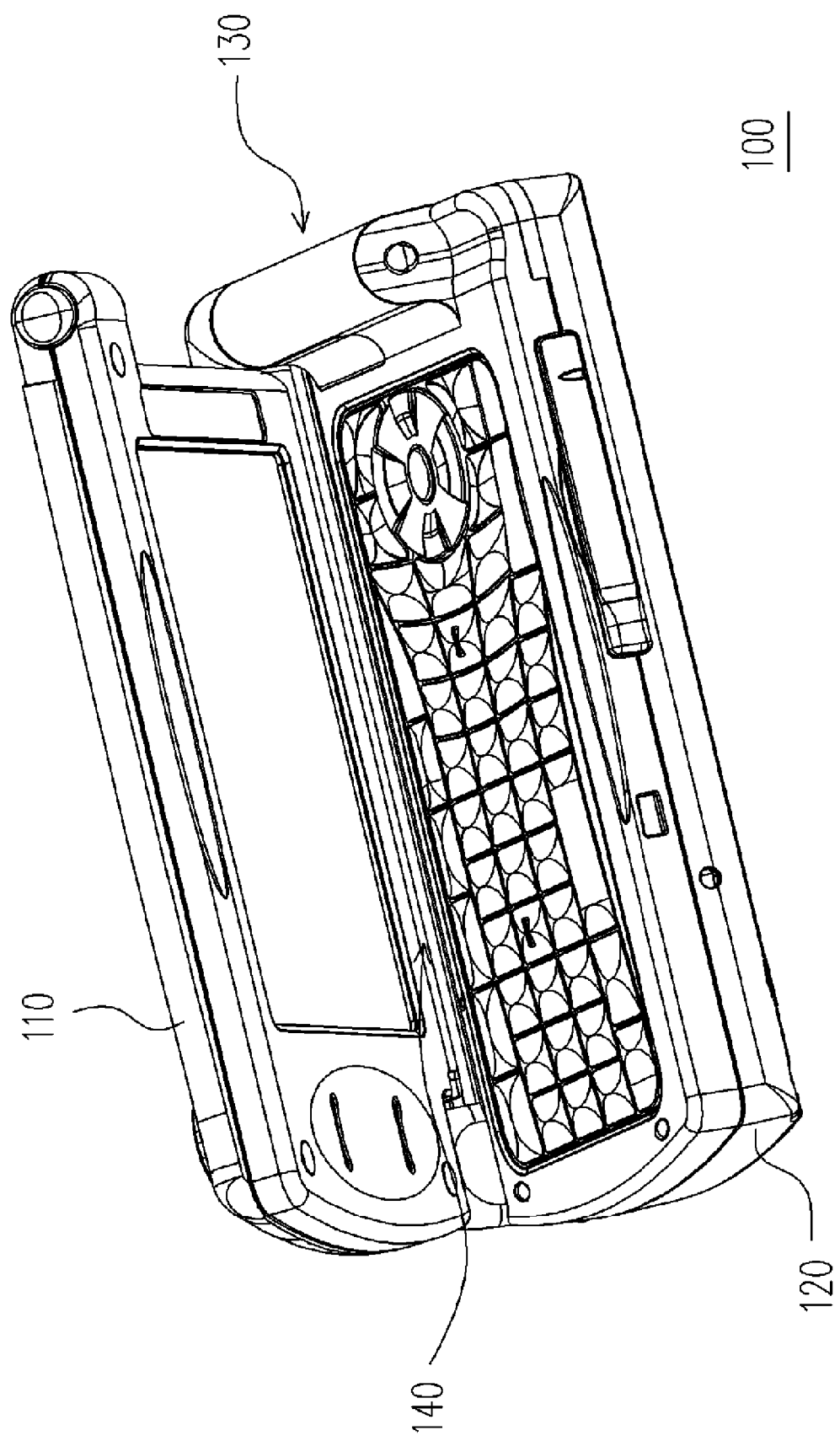
FIGS. 2A and 2B illustrate the first and the second modes of the multi-mode foldable electronic apparatus in FIG. 1, respectively.

FIG. 2A illustrates the first mode of the multi-mode foldable electronic apparatus in FIG. 1. Referring to FIG. 2A, along with the rotation of the first housing 110, the magnetism (including magneto-resistance and magnetic pole) of the first magnet 150 and the second magnet 170 changes when the multi-mode foldable electronic device 100 is opened, causing the first housing 110 rotates relative to the second housing 120 rotates via the second hinge 140. When identifying changes in the first magnet 150, the first magnetism sensor 160 generates the corresponding first signal for sending to the system. In the meantime, the second magnetism sensor 180 generates the corresponding second signal for sending to the system when identifying changes in the second magnet 170. When the system receives the first and second signals, it commands the multi-mode foldable electronic apparatus 100 to be in a first mode, such as a Personal Digital Assistant (PDA) mode.

Figure 2B:
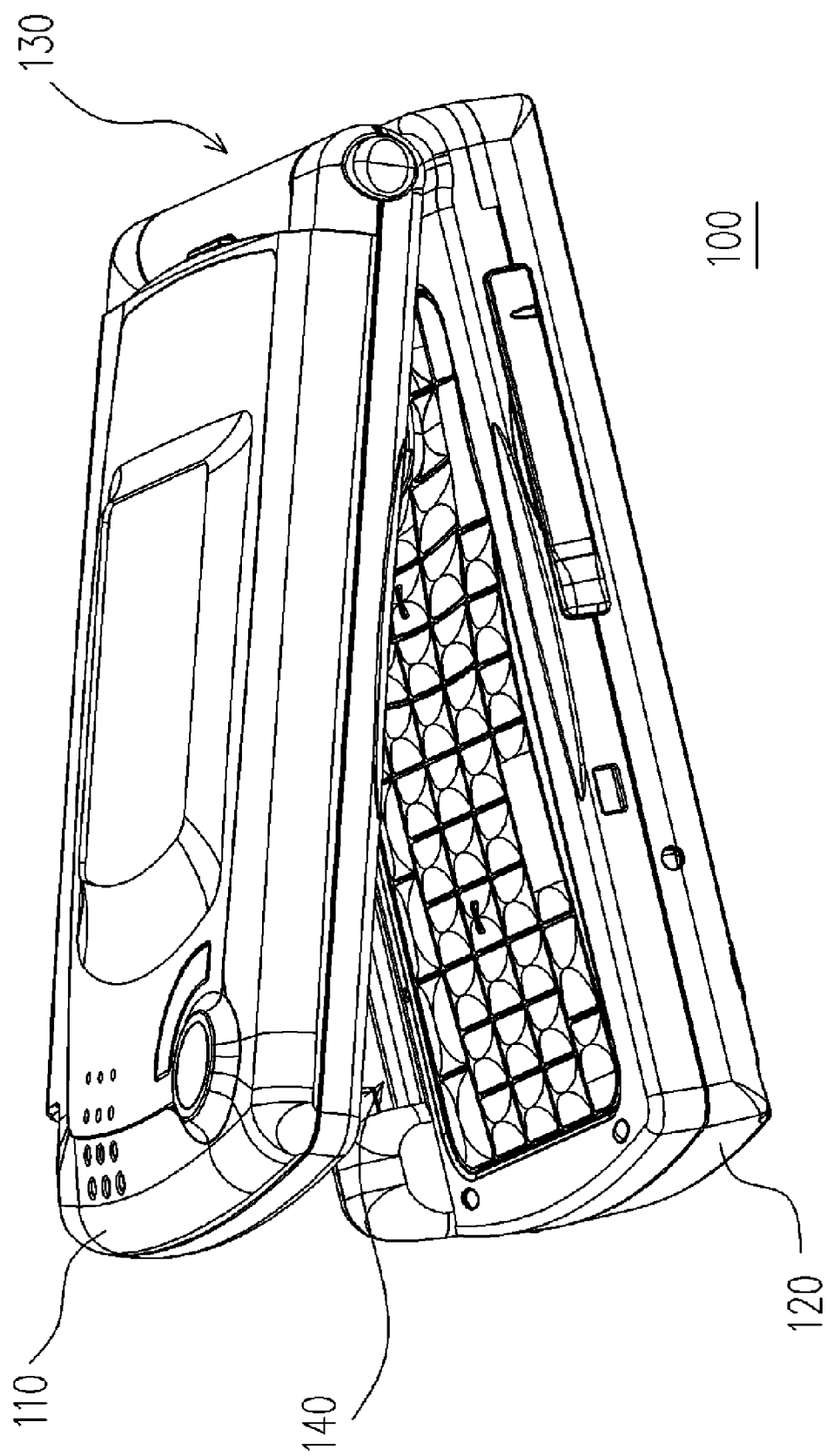

FIG. 2B illustrates the second mode of the multi-mode foldable electronic apparatus in FIG. 1. If the multi-mode foldable electronic apparatus 100 is opened, causing the first housing 110 rotates relative to the second housing 120 rotates via the second hinge 140, the first magnetism sensor 160 senses changes in the magnetism of the first magnet 150, and then generates a first signal for sending to the system. Given that the circular second magnet 170 is connected to the first the hinge 130, no changes in the magnetism are generated when the first housing 110 rotates with the first the hinge 130 relative to the second housing 120 and the second magnet 170 rotates along with the first hinge 130, regardless. Accordingly, the second magnetism sensor 180 does not generate a second signal for sending to the system when sensing changes in the magnetism of the first magnet 170. When the system receives the first signal, it commands the multi-mode foldable electronic apparatus 100 to be in a second mode, such as a cellular phone mode.

Since the accuracy of sensing signals of a magneto-resistive sensor is higher than that of a magnetic pole sensor. Therefore, when the embodiment uses a magneto-resistive sensor as the second magnetism sensor, inaccuracy in identifying the mode state can be avoided effectively.

Even though the multi-mode foldable electronic apparatus 100 of the embodiment switches among a stand-by mode, a PDA mode and a cellular telephone mode, the design of the multi-mode foldable electronic apparatus 100 can switch to other modes as required. Additionally, the multi-mode foldable electronic apparatus 100 needs to switch to the initial mode, such as: the stand-by mode in FIG. 1 before switching among different modes such as: the first mode in FIG. 2A and the second mode in FIG. 2B.

Figure 3:
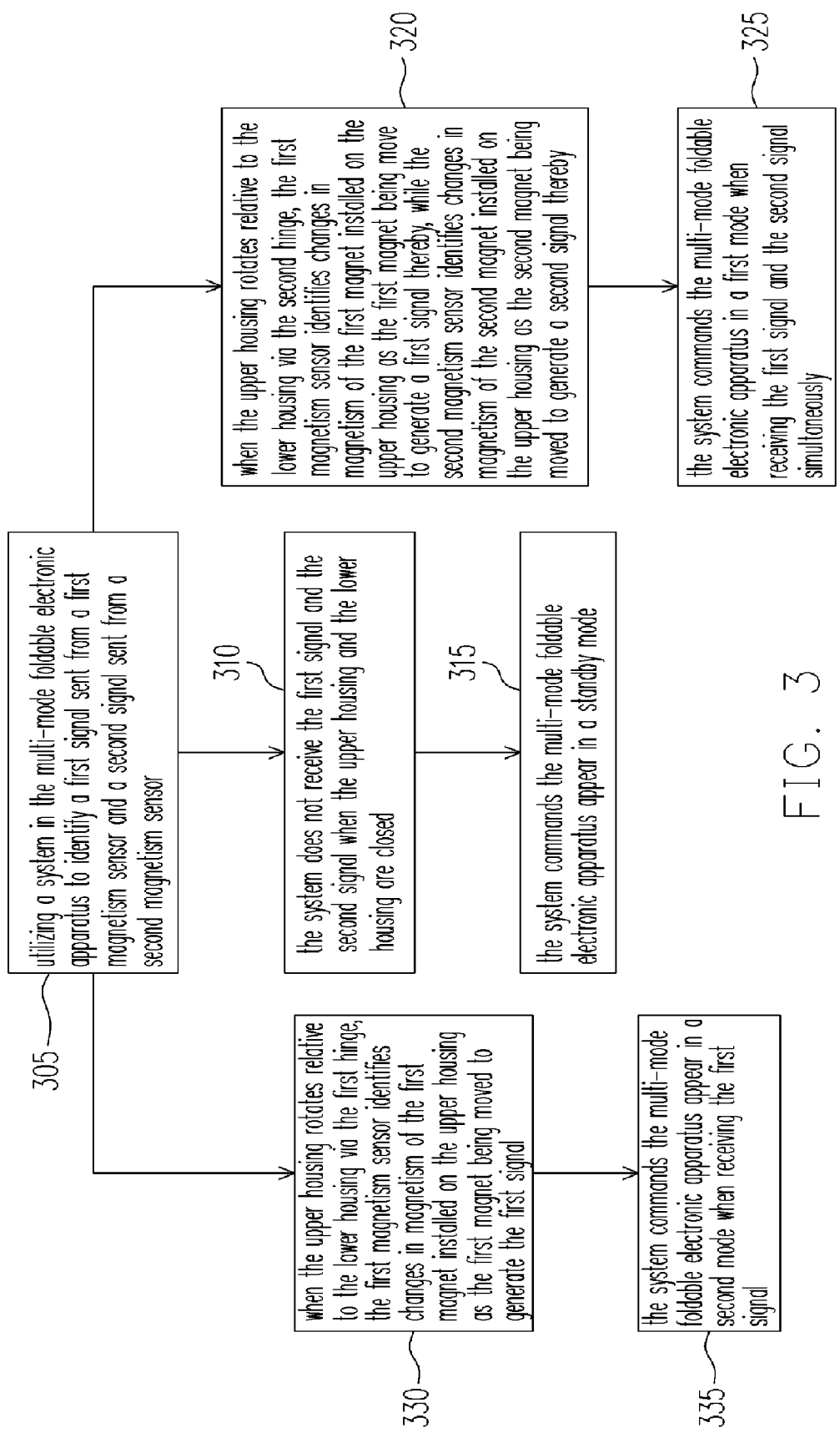
FIG. 3 is a flow chart of the system operation of the multi-mode foldable electronic apparatus of the invention.

Referring to FIG. 3, a flow chart of the system operation of the multi-mode foldable electronic apparatus of the invention, the multi-mode foldable electronic apparatus of the invention comprises a first housing, a second housing, a first hinge, a second hinge, a first magnet, a first magnetism sensor, a second magnet, a second magnetism sensor and a system, wherein the first hinge and the second hinge are used for connecting the first housing and the second housing. The first magnet is disposed in the first housing and the second magnet is disposed in the first housing and on one side of the first hinge, in order to rotate when the first hinge rotates and move along with the first housing. The first magnetism sensor is disposed in the second housing, opposite to the first magnet, for sensing the magnetic force variance of the first magnet as the first magnet is moved, and generate a first signal thereby. The second magnetism sensor is also disposed in the second housing to opposite to the second magnet, for sensing change in the magnetism of the second magnet as the second magnet being moved to generate a second signal thereby. When started, the system firstly identifies whether a first magnetism sensor and a second magnetism sensor send a first signal and a second signal or not (see Block 305). When the first housing and the second housing are closed, the system will not receive a first signal or a second signal (see Block 310). In this case, the system commands the multi-mode foldable electronic apparatus in a standby mode (see Block 315).

When the first housing rotates relative to the second housing via the second hinge, the first magnetism sensor identifies changes in magnetism of the first magnet installed on the first housing as the first magnet being moved to generate a first signal thereby. In the meantime, the second magnetism sensor identifies changes in magnetism of the second magnet installed on the first housing as the second magnet being moved to generate a second signal thereby (see Block 320). In the follow step, the system commands the multi-mode electronic apparatus in a first mode when receiving the first signal and the second signal simultaneously (see Block 325), wherein the first mode is a PDA mode. When the first housing rotates relative to the second housing via the first hinge, the first magnetism sensor identifies changes in magnetism of the first magnet installed on the first housing as the first magnet being moved to generate a first signal thereby (see Block 330). In this case, the system commands the multi-mode foldable electronic apparatus in a second mode when receiving the first signal (see Block 335), wherein the second mode can be a cellular phone mode.

As described above, the multi-mode foldable electronic apparatus of the invention utilizes a first magnet and a second magnet installed in its first housing, and utilizes a first magnetism sensor and a second magnetism sensor installed in its second housing to sense changes in magnetism of the first magnet and the second magnet respectively, to switch among different modes. Therefore, users can switch to different modes automatically easily with the multi-mode foldable electronic apparatus when opening and closing the first housing and the second housing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-mode foldable electronic apparatus, comprising:
    a first housing;
    a second housing;
    a first hinge for connecting the first housing and the second housing;
    a second hinge for connecting the first housing and the second housing;
    a first magnet disposed in the first housing;
    a second magnet disposed in the first housing and on one side of the first hinge;
    a first magnetism sensor disposed in the second housing to opposite to the first magnet, for sensing changes in first magnetism of the first magnet to generate a first signal thereby;
    a second magnetism sensor disposed in the second housing to opposite to the second magnet, for sensing changes in second magnetism of the second magnet to generate a second signal thereby; and
    a system connected to the first magnetism sensor and the second magnetism sensor, for receiving the first signal and the second signal and changing the mode of the multi-mode foldable electronic apparatus, wherein the system receives the first signal and the second signal simultaneously when the first housing rotates relative to the second housing via the second hinge.

2. The multi-mode foldable electronic apparatus according to claim 1, wherein the circular second magnet appears is disposed on one side of the first hinge.

3. The multi-mode foldable electronic apparatus according to claim 1, wherein the second magnet can rotate along with the first hinge.

4. The multi-mode foldable electronic apparatus according to claim 1, wherein the system commands the multi-mode foldable electronic apparatus in a first mode.

5. The multi-mode foldable electronic apparatus according to claim 4, wherein the first mode is a Personal Digital Assistant (PDA) mode.

6. The multi-mode foldable electronic apparatus according to claim 1, wherein the system only receives the first signal when the first housing rotates relative to the second housing via the first hinge.

7. The multi-mode foldable electronic apparatus according to claim 6, wherein the system commands the multi-mode foldable electronic apparatus in a second mode.

8. The multi-mode foldable electronic apparatus according to claim 7, wherein the second mode is a cellular phone mode.

9. The multi-mode foldable electronic apparatus according to claim 1, wherein the system commands the multi-mode foldable electronic apparatus appear in a standby mode when the system does not receive the first and the second signals.

10. The multi-mode foldable electronic apparatus according to claim 1, wherein the first magnetism sensor is a magneto-resistive sensor.

11. The multi-mode foldable electronic apparatus according to claim 1, wherein the second magnetism sensor is a magneto-resistive sensor.

12. The multi-mode foldable electronic apparatus according to claim 1, wherein the first magnetism sensor is a magnetic pole sensor.

13. The multi-mode foldable electronic apparatus according to claim 1, further comprising an image display interface disposed in the first housing.

14. The multi-mode foldable electronic apparatus according to claim 1, further comprising a touch input interface disposed in the second housing.

15. The multi-mode foldable electronic apparatus according to claim 1, wherein the first hinge and the second hinge are L-shaped.

16. The multi-mode foldable electronic apparatus according to claim 1, wherein changes in the first and the second magnetisms comprise changes in magneto-resistance and magnetic pole.

17. A method for used in a multi-mode foldable electronic apparatus, comprising:
    (a) utilizing a system in the multi-mode foldable electronic apparatus to identify a first signal sent from a first magnetism sensor and a second signal sent from a second magnetism sensor, wherein the multi-mode foldable electronic apparatus comprises a first housing and a second housing, a first hinge and a second hinge used for connecting the first housing and the second housing with each other, and the first magnetism sensor and the second magnetism sensor disposed in the second housing;
    (b) the system does not receive the first signal and the second signal when the first housing and the second housing are closed;
    (b 1) the system commands the multi-mode foldable electronic apparatus appear in a standby mode;
    (c) when the first housing rotates relative to the second housing via the second hinge, the first magnetism sensor identifies changes in magnetism of the first magnet installed on the first housing as the first magnet being move to generate a first signal thereby, while the second magnetism sensor identifies changes in magnetism of the second magnet installed on the first housing as the second magnet being moved to generate a second signal thereby, wherein the second magnet is disposed on one side of the first hinge;
    (c1) the system commands the multi-mode foldable electronic apparatus in a first mode when receiving the first signal and the second signal simultaneously;

(d) when the first housing rotates relative to the second housing via the first hinge, the first magnetism sensor identifies changes in magnetism of the first magnet installed on the first housing as the first magnet being moved to generate the first signal; and (d1) the system commands the multi-mode foldable electronic apparatus appear in a second mode when receiving the first signal.

18. The method for used in a multi-mode foldable electronic apparatus according to claim 17, wherein the circular second magnet appears is disposed on one side of the first hinge.

19. The method according to claim 17, wherein the second magnet can rotate along with the first hinge.

20. The method according to claim 17, wherein the first mode is a PDA mode.

21. The method according to claim 17, wherein the second mode is a cellular phone mode.

22. The method according to claim 17, wherein the first magnetism sensor is a magneto-resistive sensor.

23. The method according to claim 17, wherein the second magnetism sensor is a magneto-resistive sensor.

24. The method according to claim 17, wherein the first magnetism sensor is a magnetic pole sensor.

25. The method according to claim 17, wherein the multi-mode foldable electronic apparatus further comprises an image display interface disposed in the first housing.

26. The method according to claim 17, wherein the multi-mode foldable electronic apparatus further comprises a touch input interface disposed in the second housing.

27. The method according to claim 17, wherein the first hinge and the second hinge are L-shaped.

28. The method according to claim 17, wherein changes in first and the second magnetisms both comprise changes in magnetisms of magneto-resistance and magnetic pole.

* * * * *